United States Patent
Powell

(10) Patent No.: US 7,369,617 B2
(45) Date of Patent: May 6, 2008

(54) MULTI-DIMENSIONAL DATA INTERLEAVING COMMUNICATIONS SYSTEM

(75) Inventor: Scott Powell, Carlsbad, CA (US)

(73) Assignee: Broadcom Corporation, Irvine, CA (US)

( * ) Notice: Subject to any disclaimer, the term of this patent is extended or adjusted under 35 U.S.C. 154(b) by 696 days.

(21) Appl. No.: 10/786,362

(22) Filed: Feb. 26, 2004

(65) Prior Publication Data

US 2004/0258167 A1 Dec. 23, 2004

Related U.S. Application Data

(60) Provisional application No. 60/479,915, filed on Jun. 20, 2003.

(51) Int. Cl.
*H04L 27/00* (2006.01)

(52) U.S. Cl. ...................................... 375/259

(58) Field of Classification Search ................ 375/259, 375/341, 261, 265; 725/111; 370/351, 242
See application file for complete search history.

(56) References Cited

U.S. PATENT DOCUMENTS

| | | | | |
|---|---|---|---|---|
| 5,946,357 | A * | 8/1999 | Sandin et al. | 375/296 |
| 2002/0196766 | A1* | 12/2002 | Hwang et al. | 370/342 |
| 2004/0128696 | A1* | 7/2004 | Bhaskaran et al. | 725/111 |
| 2004/0160943 | A1* | 8/2004 | Cain | 370/351 |

* cited by examiner

*Primary Examiner*—Khai Tran
(74) *Attorney, Agent, or Firm*—Sterne, Kessler, Goldstein & Fox P.L.L.C.

(57) ABSTRACT

An interleaving operation can scramble (permute) a data stream, or each dimension (set of symbols (a, b, c, ...)) in a data stream, immediately following FEC encoding or dimension multiplexing of the data stream. Bursts of errors might be combined with the permuted data before, during, or after transmission. A de-interleaver reorders the received symbols and, in the process, spreads (separates) the bursts of errors. Also, using the multi-dimensional interleaving and de-interleaving can balance SNR on each channel. Spreading the errors and/or balancing SNR can keep bursts from overwhelming the FEC decoder or an FEC decoder in any one channel. In one example, interleaving and de-interleaving can be used to scramble data over Ethernet twisted wire pairs. In another example, interleaving and de-interleaving can be used to scramble data or information broadcast via wireless telecommunications channels (e.g., radio frequency channels, multi-antenna channels, etc).

18 Claims, 4 Drawing Sheets

MULTI-DIMENSIONAL DATA INTERLEAVING COMMUNICATIONS SYSTEM

CROSS REFERENCE TO RELATED APPLICATIONS

This application claims benefit under 35 U.S.C. §119(e) to U.S. Provisional Patent Application No. 60/479,915, filed Jun. 20, 2003, entitled "Multi-Dimensional Data Interleaving Communications System and Method," which is incorporated by reference herein in its entirety.

BACKGROUND OF THE INVENTION

1. Field of the Invention

The present invention is related to data interleaving systems used in communications systems.

2. Background Art

Multi-dimensional communications is a technique used to transmit a single high rate (speed) data stream (e.g., gigabit data speeds or rates) as multiple lower rate data streams between first and second communications devices. Each dimension is represented by symbols or bits ($a_n$, $b_n$, $c_n$, . . . ) in the data stream. The high rate data stream is multiplexed into multiple lower rate data streams, for example one data stream per symbol or bit, prior to transmission from the first communications device. Each of the lower rate data streams is transmitted over an independent channel. The multiple channels are often referred to as dimensions in a high order signaling scheme. The data stream having lower rate parallel data streams is received at the second communications device and is multiplexed back into a single high speed data stream to recover the transmitted data. Examples include physically independent channels, such as the multiple conductor (e.g., wire) pairs in a Cat 5 unshielded twisted pair (UTP) cable, or electrically independent channels, such as the multiple carriers in a frequency domain multiplex (FDM) system.

Forward error correction (FEC) is used to detect and correct transmission errors that can occur during transmission of the lower rate data streams. If errors occur in bursts (e.g., groups), FEC may not be able to handle the burst and may fail to correct the errors. This may be true even though the average error rate is within the correction capability of the FEC. Burst errors can occur in the transmission channel or can be the result of signal processing, such as error propagation from decision feedback equalization or the inner code of concatenated FEC.

Time domain interleaving is a technique for spreading out bursts of errors so that the peak error rate more closely approximates the average error rate. This is important because FEC algorithms are most effective when processing average error rates, but can be much less effective when processing bursts of errors. Although time domain interleaving can be used to break up the bursts, time domain interleaving can have high latency. Latency usually refers to how long a system must wait until data starts to flow, while throughput usually refers to a speed of data flow. Thus, although throughput may be high in time domain interleaving, the latency can be relatively long. The long latency can become a problem in two-way communications systems, such as telecommunications, Ethernet, Internet, Intranet, etc, which can limit applications that utilize interleaving causing degraded FEC effectiveness.

Time-domain interleaving approaches (e.g., convolutional, block, etc.) use large memories that store data in natural order and read out data in permuted order. The time-domain approach adds an inherent latency that is proportional to the interleaving depth. Also, the use of time-domain interleaving is precluded in applications that cannot tolerate large latency. Thus, latency sensitive applications, such as voice and other two-way interactive channels, cannot make use of time-domain interleavers to combat burst errors in conventional systems.

Additionally, the noise characteristics of physically independent channels in a multi-channel system may not be identical. The error rate will be bounded by the channel with the lowest signal-to-noise ratio (SNR) even when the remaining channels have higher SNR.

Therefore, what is needed is an interleaving system and method that substantially reduces latency, balances SNR of independent channels, and maintains high throughput in a communications system that uses FEC.

BRIEF SUMMARY OF THE INVENTION

An embodiment of the present invention provides a system and method that can interleave and de-interleave data (e.g., multi-dimensional data) of a multi-dimensional communications channel to achieve burst error protection and SNR balancing without incurring a latency penalty. Dimension interleaving and de-interleaving can be made part of the multiplexing process inherent in multi-channel communications. After de-multiplexing into parallel data streams, a dimension interleaver can permute the data streams to data channels prior to transmission. Long burst errors added to any single channel containing dimension interleaved data will be spread across multiple data streams after dimension de-interleaving.

Another embodiment of the present invention provides a system including a forward error correction encoder, forward error correction decoder, an interleaver, a de-interleaver, and a transmission system between the interleaver and the de-interleaver which could, optionally, contain further error correction coding and/or interleaving. The forward error correction encoder encodes a first signal to produce a second signal. The interleaver interleaves the second signal to produce a third signal. The transmission system transmits the third signal. The de-interleaver de-interleaves the third signal and a possible error signal combined with the third signal during transmission of the third signal to produce a fourth signal, such that any burst of the error signal is spread out. The forward error correction decoder decodes the fourth signal to produce a fifth signal.

A still further embodiment of the present invention provides a system including first and second two-stage multiplexing systems, a two-stage interleaving system, and a two-stage de-interleaving system. The system also includes a transmission system coupled between a second stage of the interleaving system and a first stage of the de-interleaving system. Each stage of the interleaving system is positioned subsequent to a corresponding stage of the first multiplexing system. Each stage of the second multiplexing system is positioned subsequent to a corresponding stage of the de-interleaving system.

Further embodiments, features, and advantages of the present inventions, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 1:
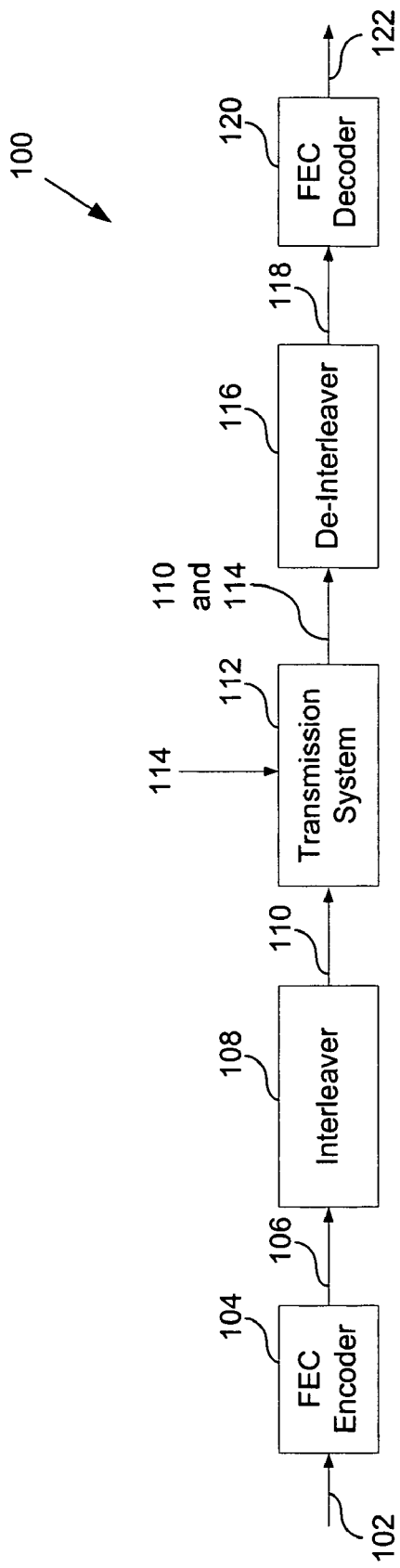
FIG. 1 shows a communications system according to an embodiment of the present invention.

The present invention will now be described with reference to the accompanying drawings. In the drawings, like reference numbers may indicate identical or functionally similar elements. Additionally, the left-most digit(s) of a reference number may identify the drawing in which the reference number first appears.

DETAILED DESCRIPTION OF THE INVENTION

Overview

An interleaving operation can scramble (permute) a data stream, or each dimension (set of symbols (a, b, c, . . . ) in a data stream, immediately following FEC encoding or dimension multiplexing of the data stream. Bursts of errors might be combined with the permuted data before, during, or after transmission. A de-interleaver reorders the received symbols and, in the process, can spread (separates) the bursts of errors and can balance SNR. Spreading the errors and/or balancing SNR keeps bursts from overwhelming the FEC decoder or any one channel of FEC decoders.

In one example, interleaving and de-interleaving can be used to scramble data over Ethernet twisted wire pairs.

In another example, interleaving and de-interleaving can be used to scramble data or information broadcast via wireless telecommunications channels (e.g., radio frequency channels, multi-antenna channels, etc).

Forward Error Correction and Interleaving System

FIG. 1 shows communications system 100 according to an embodiment of the present invention. System 100 receives a first signal 102 (e.g., a high data rate signal) at an FEC encoder 104, which encodes signal 102 to produce a second signal 106. Second signal 106 is interleaved using an interleaver 108 (e.g., a delay circuit, a multiplexer, a switching system, a permutator, etc.) to produce a third signal 110. Third signal 110 is transmitted via a transmission system 112. In various embodiments, transmission system 112 can have additional levels of encoding and/or decoding (e.g., a concatenated encoding scheme), one or more transmitters, receivers, transceivers, cables, and the like. Before, during, and/or after transmission, third signal 110 can be combined with a possible error signal 114 (e.g., one or more bits of noise). Third signal 110 and possible error signal 114 are de-interleaved using de-interleaver 116 to produce a fourth signal 118. Fourth signal 118 is FEC decoded using FEC decoder 120 to form fifth signal 122.

Interleaver 108 can be used spread portions (e.g., bits or symbols (a, b, c, . . . ) of second signal 106 out in time to form third signal 110. For example, symbols of second signal 106 that were previously next to each other in time become spread out in time in third signal 110. When possible error signal 114 combines with third signal 110, portions (e.g., noise bits or symbols or error bits or symbols) of possible error signal 114 can become adjacent to each other (e.g., form bursts or groups of noise).

De-interleaver 116 can reorganize and place back in order the symbols of second signal 106 that were spread out in third signal 110 to form fourth signal 118. Through the reorganization, de-interleaver 116 can spread the burst so that the noise bits are no longer adjacent to each other. Thus, although the noise may corrupt the same amount of data symbols, adjacent data symbols are not corrupted. Putting space between the noise bits allows FEC decoder 120 to most effectively work. For example, putting space between the noise bits can avoid having 5 or 10 sequential symbols in fourth signal 118 designated as being BAD. FEC decoder 120 can then detect and correct for errors without being overwhelmed.

De-interleaver 116 can also balance SNR on each channel. For example, if one channel has low SNR (resulting in more errors, not necessarily in bursts), the other channels have high SNR (resulting in few errors), the channels will all tend to have the same SNR after dimension interleaving/de-interleaving. This, either in conjunction with or instead of spreading of burst errors, can help to keep from overwhelming the decoder on the low SNR channel. This can result from the embodiments discussed below.

Multi Dimensional Forward Error Correction and Interleaving System

Figure 2:
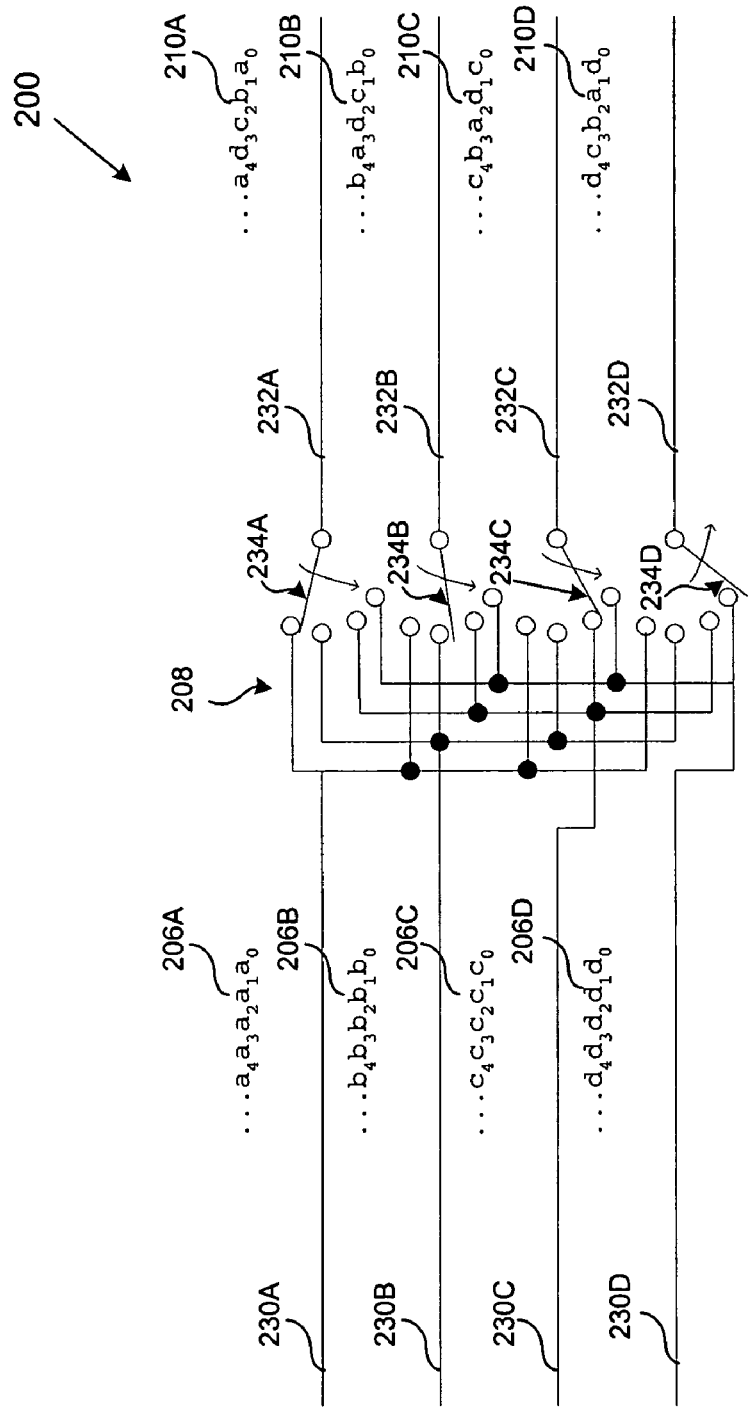
FIG. 2 shows an example implementation of four dimensional interleaving according to an embodiment of the present invention.

FIG. 2 shows an interleaver 208 according to an embodiment of the present invention. In this embodiment, for example in an Ethernet environment, second signals 206A-206D having symbols $a_n$, $b_n$, $c_n$, and/or $d_n$ can be transmitted over conductors 230A-230D (e.g., wires, RF channels, etc.), respectively. Wires 230A-230D can be a bundle of four wires (e.g., four wire pairs). Interleaver 208 is shown as a multiplexing or switching system that can be used to scramble or permutate second signals 206A-206D to form third signals 210A-210D. In this embodiment, interleaving is accomplished through scrambling which of wires 232 (e.g., 232A-232D) the symbols of second signals 206 are transmitted on, instead of using conventional time domain interleaving discussed above.

In one example, interleaver 208 can take a first symbol (e.g., $a_0$) of the second signal 206A and place it on first wire 232A, a second symbol (e.g., $b_0$) second signal 206B and place it on a second wire 232B, an so on. This can be done during a first time period when a first switch 234A connects wire 230A and 232A, a second switch 234B connects wire 230B and 232B, a third switch connects wire 230C and 232C, and a fourth switch 234D connects wire 230D and 232D. Then, during a second time period, each switch 234A-234D advances, such that switch 234A connects wires 230B and 232A, switch 234B connects wires 230C and 232B, switch 234C connects wires 230D and 232C, and switch 234D connects wires 230A and 232D. During subsequent time periods, similar advances of switches 234A-234D can be accomplished to make desired connections between wires 230A-230D and respective wires 232A-232D.

In another example, switches 234A-234D of interleaver 208 can move in random (or other) sequences to connect respective wires 230 with respective wires 232 to form random (or other) sequences of symbols.

In an N-dimensional data transmission system, N symbols (or data samples a, b, c, and d) are available simultaneously. Interleaving can be performed with no latency by re-ordering the symbols (a, b, c, and d) across the dimensions. FIG. 2 illustrates an example where four synchronous memory-less commutators 234 implement a dimension interleaver across four parallel data streams 206. Each commutator 234 starts at a different position and rotates connections synchronous with the data symbols (a, b, c, and d). Since the commutators 234 simply re-route the data symbols (a, b, c, and d), no latency is incurred in the interleaving or de-interleaving process.

Four Channel/Four Dimensional Communications System

Figure 3:
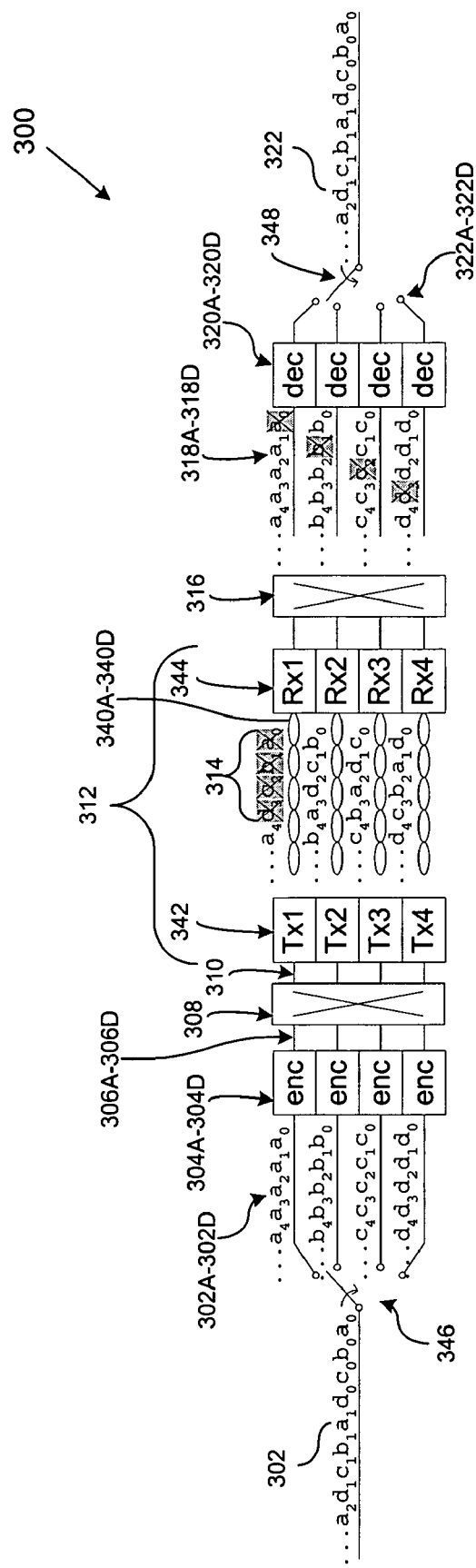
FIG. 3 shows a four channel communications system according to embodiments of the present invention.

FIG. 3 illustrates a system 300 according to an embodiment of the present invention. In system 300, first signal 302 (e.g., a single multi-dimensional data stream) is to be transmitted via a transmission system 312 that includes four parallel wires 340A-340D each coupled between a transmitter 342 (e.g., possibly transmitters 342A-342D) and a receiver 344 (e.g., possibly receivers 344A-344D). It is to be appreciated that in other embodiments transceivers can be used in transmission system 312. It is also to be appreciated transmission system 312 can be functionally similar to transmission systems 112 described above.

First signal 302 is multiplexed by a multiplexer 346 into its respective dimensions to form first signals 302A-302D. Thus, each first signal 302A-302D is formed as one of the multi-dimensional symbols (a, b, c, and d).

First signals 302A-302D are processed using respective FEC encoders 304A-304D to form second signals 306A-306D. Second signals 306A-306D are interleaved by an interleaver 308 (which can be similar to interleaver 208) to form third signals 310A-310D. Third signals 310 are transmitted through transmission system 312, and may be combined with an error signal 314. In one embodiment, transmission system 312 can further encode and decode third signal 310.

After being received at a receiver 344, as possibly decoded, third signals 310 and possible error signal 314 are processed through a de-interleaver 316 to produce fourth signals 318A-318D. Respective FEC decoders 320A-320D processes fourth signals 318A-318D to produce fifth signals 322A-322D. Fifth signals 322A-322D are de-scramble by a de-multiplexer 348 to form a single fifth signal 322 with the symbols (a, b, c, and d) in a similar order as signal 302.

Data must be arranged properly on both sides of transmission system 312. In order to do this synchronization data can be derived from the data itself or additional signals can be transmitted along with the data. The synchronization data can then be used by multiplexing system 348 to properly arrange the data.

For example, if there are four bits of error signal 314 (shown as shaded boxes with an X) on channel 340A, after de-interleaver 316 there is only one error bit on each of four channels. If used in a conventional system, FEC decoder 320A most likely would have failed when confronted with all four errors in a row. However, when used at least in this embodiment of the present invention, through de-interleaving FEC decoders 320A-320D only see a single error each, such that FEC decoders 320A-320D in system 300 can function normally.

Accordingly, in the embodiments shown in systems 200 and 300, the data is de-multiplexed into four parallel data streams at ¼ the original rate. Each ¼ rate data stream is independently encoded with an appropriate FEC code. The encoded 4-dimensional data then passes through a dimension interleaver 208 or 308 and is formatted for transmission. As best seen in FIG. 3, the interleaved data is then transmitted across the four wires and one of the wires may receive a four symbol long error burst 314. A dimension de-interleaver 316 reorders the data back to the appropriate channels and, in the process, distributes the four symbol error burst 314. Without dimension interleaving, one FEC decoder 320 (e.g., FEC decoder 320A) would have been required to correct all four errors, while the other three FEC decoders 320B-320D would not have been required to make any corrections. With dimension interleaving, no FEC decoder 320A-320D sees more than a single error. If, for example, individual FEC decoders 320A-320D can reliably correct up to three error bursts, a system without dimension interleaving would fail whereas systems 100, 200, and 300 with dimension interleaving can be error free. As can be seen from this simple example, the dimension interleaver can balance the error rate and/or the SNR in each channel.

Time Domain and Frequency Domain Interleaving System and Method

It is to be appreciated that dimension interleavers and de-interleavers can be nested to achieve greater interleaving depth (burst protection) without incurring additional latency. For example, consider a 4-wire unshielded twisted pair (UTP) system where each wire carries a frequency domain multiplexed (FDM) signal. A dimension interleaver associated with the 1-to-4 wire de-multiplexing can be nested with a second dimension interleaver associated with a time domain multiplexed (TDM) to FDM operation on each of the 4 wires. This embodiment is shown in FIG. 4, and described in more detail below.

Figure 4:
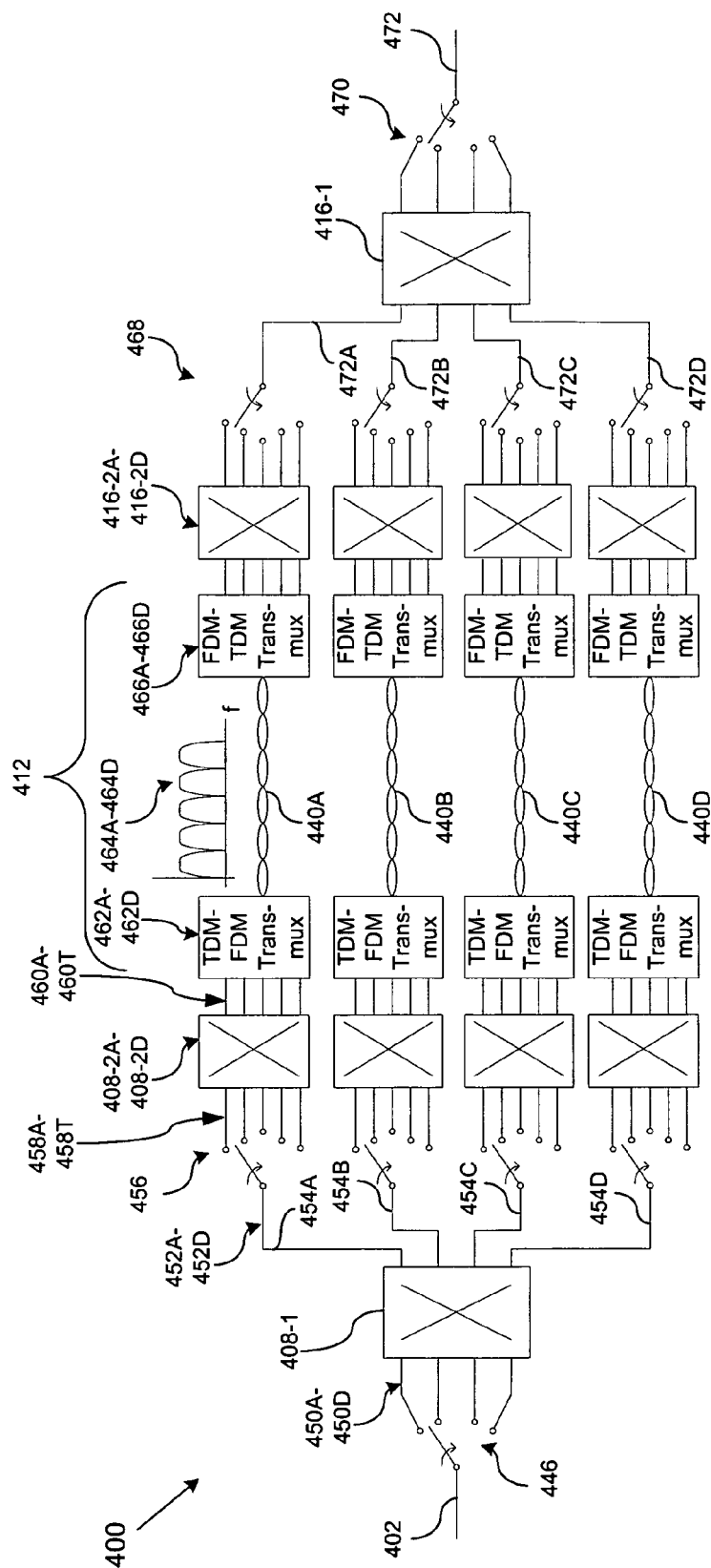
FIG. 4 shows a twenty channel communications system according to an embodiment of the present invention.

FIG. 4 shows a system 400 in which a transmission system 412 includes a four-wire system 440A-440D that transmits signals in one of five frequencies (e.g., tones, bins, or a toric frequency domain multiplexing (FDM) transmission scheme) to increase interleaving and error spreading. This scheme has an interleaving depth of 20, meaning that error bursts up to 20 symbols long on any one channel will be spread out so that no frequency channel has more than a single error.

First signal 402 (e.g., having four symbols (dimensions) a, b, c, and d) is multiplexed by a multiplexer 446 onto four wires 450A-450D, one for each symbol, and is processed by a first interleaver 408-1 of a two-stage interleaving system. After being processed using first interleaver 408-1, the data 452A-452D on each of the four wires 454A-454D is multiplexed by a multiplexer system 456 before being transmitted to second interleavers 408-2A-408-2D of the two-stage interleaving system. Multiplexing system 456 spreads the data onto five frequencies (e.g., tones, bins, etc.). Thus, four sets of data 454A-454D leaving first interleaver 408-1 are formed into 20 sets of data 458A-458T entering second interleavers 408-2A-408-2D using the multiplexer system 456.

After being processed in second interleavers 408-2A-402-2D, data 460A-460T is passed through time domain multiplexing-frequency domain multiplexing (TDM-FDM) trans-multiplexing system 462A-462D before being transmitted across channels 440A-440D. Each TDM-FDM trans-multiplexer in system 412 can periodically attach a different frequency to a sequence of data 464A-464D being sent over each twisted wire pair 440A-440D.

On an opposite side of each channel 440, an opposite sequence to that described above is performed on the data using FDM-TDM receiving multiplexing system 466A-466D, second de-interleavers 416-2A-416-2D in a two-stage de-interleaving system, multiplexing system 468, a first de-interleaver 416-1, and de-multiplexer 470 before the data is transmitted along cable 472. The various elements in system 400 can perform similar operations as similar elements described above.

For example, across four wire pairs 440A-440D, if there are four or fewer errors in a row, the errors can be spread out so that there may never be more than one error in a row on any given wire 472A-472D, respectively. Then, by nesting four wires 472A-472D and five frequencies, the depth is further increased to 20. The greater the depth, the more effective is system 400.

It is to be appreciated that although shown for wire systems, such as for Ethernet, any wired or wireless communications system using a frequency (or other) domain based interleaving can perform the functions discussed above in order to improve latency, while maintaining high throughput of data.

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A system comprising:
    a forward error correction encoder that encodes a first signal to produce a second signal;
    an interleaver that interleaves the second signal to produce a third signal;
    a transmission system used to transmit the third signal;
    a de-interleaver that de-interleaves the third signal and a possible error signal combined with the third signal to produce a fourth signal, such that any burst of the error signals is spread out; and
    a forward error correction decoder that decodes the fourth signal to produce a fifth signal,
    wherein the transmission system comprises first and second frequency domain multiplexed transceivers that transmit and receive the third signal and the possible error signal over one of a wire or wireless transmission medium.

2. The system of claim 1, wherein the first signal and second signal comprise multi-dimensional data.

3. The system of claim 1, wherein the interleaver forms the third signal using a sequential interleaving pattern.

4. The system of claim 1, wherein the interleaver forms the third signal using a random interleaving pattern.

5. A system comprising:
    a forward error correction encoder that encodes a first signal to produce a second signal;
    an interleaver that interleaves the second signal to produce a third signal;
    a transmission system used to transmit the third signal;
    a de-interleaver that de-interleaves the third signal and a possible error signal combined with the third signal to produce a fourth signal, such that any burst of the error signals is spread out; and
    a forward error correction decoder that decodes the fourth signal to produce a fifth signal,
    wherein the transmission system comprises first and second time domain multiplexed transceivers that transmit and receive the third signal and the possible error signal over one of a wire or wireless transmission medium.

6. The system of claim 5, wherein the first signal and second signal comprise multi-dimensional data.

7. The system of claim 5, wherein the interleaver forms the third signal using a sequential interleaving pattern.

8. The system of claim 5, wherein the interleaver forms the third signal using a random interleaving pattern.

9. A system comprising:
    a forward error correction encoder that encodes a first signal to produce a second signal;
    an interleaver that interleaves the second signal to produce a third signal;
    a transmission system used to transmit the third signal;
    a de-interleaver that de-interleaves the third signal and a possible error signal combined with the third signal to produce a fourth signal, such that any burst of the error signals is spread out; and
    a forward error correction decoder that decodes the fourth signal to produce a fifth signal,
    wherein the transmission system comprises first and second frequency domain-time domain multiplexed transceivers that transmit and receive the third signal and the possible error signal over one of a wire or wireless transmission medium.

10. The system of claim 9, wherein the first signal and second signal comprise multi-dimensional data.

11. The system of claim 9, wherein the interleaver forms the third signal using a sequential interleaving pattern.

12. The system of claim 9, wherein the interleaver forms the third signal using a random interleaving pattern.

13. A system comprising:
    a forward error correction encoder that encodes a first signal to produce a second signal;
    an interleaver that interleaves the second signal to produce a third signal;
    a transmission system used to transmit the third signal;
    a de-interleaver that de-interleaves the third signal and a possible error signal combined with the third signal to produce a fourth signal, such that any burst of the error signals is spread out; and
    a forward error correction decoder that decodes the fourth signal to produce a fifth signal,
    a first multiplexer that produces a plurality of first signals; and
    a second multiplexer that produces the fifth signal from a plurality of fourth signals,
    wherein the encoding FEC and the decoding FEC include a plurality of encoding FECs and a plurality of decoding FECs, a number of each corresponding to a number of the plurality of first signals,
    wherein the possible error signals are spread over the plurality of fourth signals.

14. The system of claim 13, wherein the transmission system comprises a plurality of channels corresponding a number of the plurality of the first signals.

15. The system of claim 14, wherein the plurality of channels have substantially equal signal-to-noise ratios.

16. A system comprising:
    a two-stage multiplexing system;
    a two-stage interleaving system, wherein each stage of the interleaving system is positioned subsequent to a corresponding stage of the multiplexing system;

a transmission system coupled between a second stage of the interleaving system and a first stage of a two-stage de-interleaving system;

a two-stage de-multiplexing system, wherein each stage of the de-multiplexing system is positioned subsequent to a corresponding stage of the de-interleaving system.

17. The system according to claim 16, wherein:

a first stage of the multiplexing separates a multi-dimensional input signal into each of its dimensions;

a first stage of the interleaving system interleaves each dimension of the input signal to form second signals;

a second stage of the multiplexing system distributes each bit of the second signal to one of a plurality of frequency tones; and a second stage of the interleaving system interleaves each of the frequency tones of each of the second signals to form a transmission signal.

18. The method of claim 17, wherein step (a) further comprises:

(a1) using a multi-dimensional signal as the first signal;

(a2) directing each dimension of the multi-dimensional first signal along a separate conductor; and (a3) encoding each dimension of the multi-dimensional first signal, wherein steps (b)-(d) are performed for each dimension.

* * * * *

UNITED STATES PATENT AND TRADEMARK OFFICE
CERTIFICATE OF CORRECTION

PATENT NO. : 7,369,617 B2
APPLICATION NO. : 10/786362
DATED : May 6, 2008
INVENTOR(S) : Scott Powell It is certified that error appears in the above-identified patent and that said Letters Patent is hereby corrected as shown below:

Column 8
Line 17, please replace "a de-interleaver that dc-interleaves the third signal to" with -- a de-interleaver that de-interleaves the third signal to --.

Column 8
Line 41, please replace "a de-interleaver that dc-interleaves the third signal and a" with -- a de-interleaver that de-interleaves the third signal and a --.

Column 10
Lines 4-11, please replace current Claim 18:

18.   The method of claim 17, wherein step (a) further comprises:
      (a1) using a multi-dimensional signal as the first signal;
      (a2) directing each dimension of the multi-dimensional first signal along a separate conductor; and
      (a3) encoding each dimension of the multi-dimensional first signal, wherein steps (b)-(d) are performed for each dimension.

WITH Claim 18, as originally filed:

18.   The system according to claim 17, wherein:
      a first stage of the de-interleaving system de-interleaves each of the frequency tones of each of the transmission signals and possible error signals combined with the transmission signals during transmission to form third signals;

UNITED STATES PATENT AND TRADEMARK OFFICE
CERTIFICATE OF CORRECTION

PATENT NO.        : 7,369,617 B2
APPLICATION NO. : 10/786362
DATED             : May 6, 2008
INVENTOR(S)       : Scott Powell It is certified that error appears in the above-identified patent and that said Letters Patent is hereby corrected as shown below:

a first stage of the de-multiplexing system combines all the frequency tones for each dimension of the third signal to form a fourth signal;
      the second stage of the de-interleaving system de-interleaves each of the fourth signals to form fifth signals; and
      a second stage of the de-multiplexing system combines the fifth signals to form a sixth signal.

Signed and Sealed this

Sixth Day of October, 2009

David J. Kappos
*Director of the United States Patent and Trademark Office*